United States Patent [19]

Wiley

[11] Patent Number: 4,813,584
[45] Date of Patent: Mar. 21, 1989

[54] DETACHABLE CARGO CARRIER

[76] Inventor: Michael D. Wiley, 3009 Seneca St., Flint, Mich. 48504

[21] Appl. No.: 738,494

[22] Filed: May 28, 1985

Related U.S. Application Data

[63] Continuation of Ser. No. 591,038, Mar. 19, 1984, abandoned.

[51] Int. Cl.$^4$ .............................. B60R 9/00; B60R 9/10
[52] U.S. Cl. ........................... 224/42.44; 224/42.03 B; 224/42.07
[58] Field of Search ................. 224/42.03 R, 42.03 B, 224/42.03 A, 42.07, 42.43, 42.44, 316, 273

[56] References Cited

U.S. PATENT DOCUMENTS

| | | | |
|---|---|---|---|
| 3,202,332 | 8/1965 | Walker | 224/42.03 A |
| 3,650,443 | 3/1972 | Haskett et al. | 224/42 |
| 3,690,526 | 9/1972 | Rundel | 224/42.43 X |
| 3,724,694 | 4/1973 | Wilson | 224/42.07 X |
| 3,796,333 | 3/1974 | Goldstein | 224/42.44 X |
| 3,912,098 | 10/1975 | Nicotra | 224/42.03 B X |
| 4,072,257 | 2/1978 | Hall | 224/42.03 B |
| 4,234,284 | 11/1980 | Hauff | 224/42.44 X |
| 4,277,008 | 7/1981 | McCleary | 224/273 |
| 4,381,069 | 4/1983 | Kreck | 224/42.44 |
| 4,394,947 | 7/1983 | Tartaglia | 224/42 |
| 4,421,260 | 12/1983 | DeVore | 224/42.43 |

Primary Examiner—Henry J. Recla
Attorney, Agent, or Firm—Gifford, Groh, Sheridan, Sprinkle and Dolgorukov

[57] ABSTRACT

A cargo carrier is detachably engageable with a standard trailer hitch. The carrier is connected solely to the hitch, rather than to any portion of the vehicle body or bumper. A hitch tongue engaging portion is insertably engagable with the trailer hitch tongue, and a platform is attached to the engaging portion. The carrier is retained on the vehicle by the passage of a lockable clevis pin through registering holes in the tongue portion and the engaging portion. The carrier has the advantages of straightforward construction and tool-free attachment to the vehicle.

4 Claims, 2 Drawing Sheets

DETACHABLE CARGO CARRIER

This application is a continuation of application Ser. No. 591,038, filed 3/19/84, now abandoned.

BACKGROUND OF THE INVENTION

I. Field of the Invention

The present invention is directed to a device for carrying cargo, and more particularly, to such a device attachable to a motor vehicle.

II. Description of the Prior Art

Cargo carriers which are attachable to motor vehicles have long been known. Some known cargo carriers are trailers, having one or more wheels which bear a substantial portion of the weight of the load carried by the carrier. Cargo trailers are conventionally attached to a motor vehicle through a trailer hitch affixed to the lower rear portion of the vehicle, generally at or below the vehicle bumper. Other cargo carriers comprise a rack or platform attached to one or more portions of the vehicle, such as a trailer hitch, the vehicle body or the vehicle bumper. Several carriers are known in which an end of a platform portion of the carrier is affixed to a portion of the vehicle above the trailer hitch, and a support member extends from the opposing end of the platform downward to the trailer hitch. The support member engages the trailer hitch to provide additional support for the platform.

Although the known cargo carriers generally function adequately for their intended purposes, their use on motor vehicles is often subject to several drawbacks. The known cargo carriers are of relatively complex structure, and are thereby rendered relatively expensive to produce. The support structures associated with these carriers require a substantial amount of time for assembly and for attachment to a vehicle. Moreover, a cargo carrier having a platform whose end must be affixed to the vehicle bumper or body may well damage that vehicle body or bumper when attached thereto.

The cargo carrying rack disclosed by Tartaglia, in U.S. Pat. No. 4,394,947, overcomes some of these problems, by providing a cargo carrier which is connected solely to the tongue of a standard trailer hitch. That carrier comprises a rack and a vertical member attached to one end of the rack, the vertical member having a threaded rod which is inserted through a corresponding hole in the trailer hitch. A pair of support brackets extend from the other end of the platform and are also affixed to the trailer hitch. These support brackets are attached to a pair of plates which engage and trap the trailer hitch tongue therebetween.

While the cargo rack of Tartaglia functions adequately for its intended purpose, its use incurs several drawbacks. The structure is relatively complex and takes some time to attach to the vehicle. Moreover, although not specifically disclosed in the patent, the cargo platform will necessarily be carried at some substantial height above the trailer hitch tongue. Presumably, this vertical displacement must be sufficient to permit the support brackets to provide some vertical support for the weight of the rack and the cargo carried thereon. In the embodiment shown in FIG. 2 of Tartaglia, the platform of the carrier is disclosed to be about level with the top of the trunk portion of the automobile on which the rack is carried. Cargo placed on the platform will necessarily sit outside a substantial portion of the slipstream created by the aerodynamic surfaces of the automobile body. Thus, the cargo rack will increase the wind resistance of the vehicle and decrease, albeit by a small amount, the fuel efficiency of the vehicle.

Of course, conventional trailers pulled by a trailer hitch suffer drawbacks as well. A complex support or spring system is often necessary to avoid transferring road shocks through the wheels to the cargo carried by the trailer. Because wheels are employed, the trailer is subject to the vagaries associated with a wheeled vehicle such as flat tires and the like. For these reasons, there is some not inconsiderable expense incurred in providing a cargo carrier with ground-engaging wheels.

SUMMARY OF THE PRESENT INVENTION

The present invention overcomes these and other difficulties by providing a cargo carrier of simple and straightforward construction, yet which is easily attachable to the vehicle and provides isolation of the cargo from road shocks. The cargo carrier of the present invention is engageable with a conventional trailer hitch tongue. The tongue has a longitudinally extending tongue portion of somewhat uniform cross section. The cargo carrier comprises a platform and a means attached to the platform for insertably engaging the tongue portion. The engaging means is thus the sole means for transferring the weight of the carrier and its associated load to the vehicle. Preferably, the engaging means comprises a longitudinally extending engaging portion, which is hollow and shaped similarly to the tongue portion, but has a smaller cross section. The engaging portion is slidable into the tongue portion, and is affixed thereto by disposing a clevis pin in a set of registering holes in both the tongue and engaging portions. Attaching or removing the cargo carrier of the present invention to or from the vehicle on which it is carried is rapid, since the carrier does not connect to the vehicle body or the vehicle bumper. Also preferably, a weather storage unit is detachably carried on the platform portion of the carrier, and is large enough to receive one or more pieces of luggage or other cargo therein.

BRIEF DESCRIPTION OF THE DRAWING

A better understanding of the present invention will be had upon reference to the following detailed description, when read in conjunction with the accompanying drawing, wherein like reference characters refer to like parts throughout the several ways, and in which.

DETAILED DESCRIPTION OF THE PREFERRED EMBODIMENT OF THE PRESENT INVENTION

Figure 1:
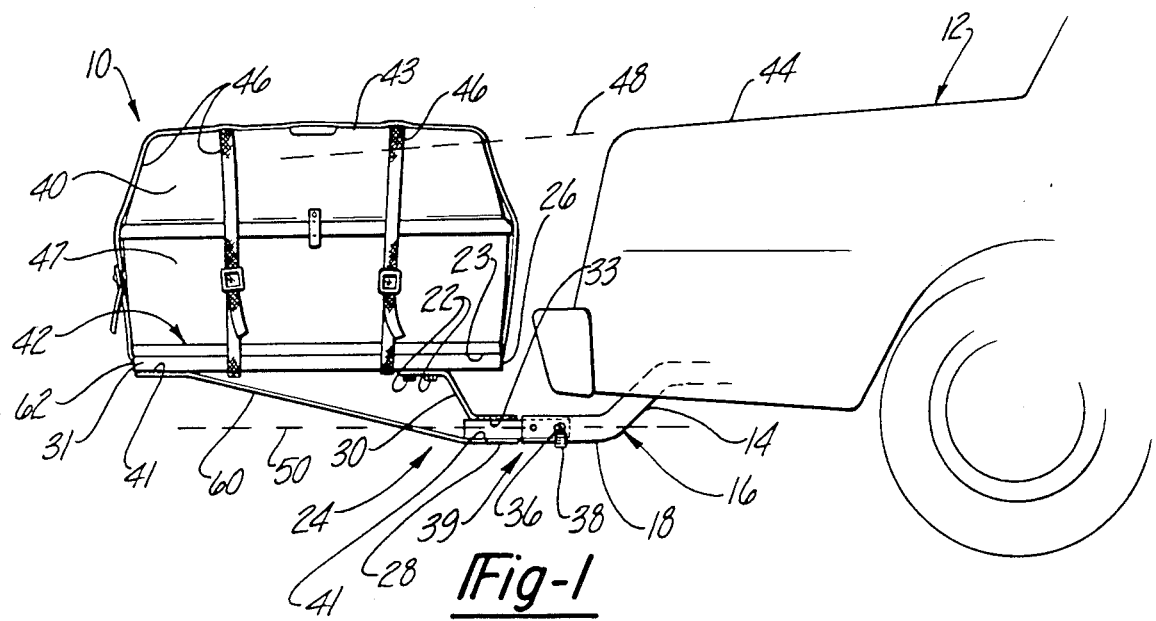
FIG. 1 is a side view of the preferred embodiment of the present invention.
Figure 2:
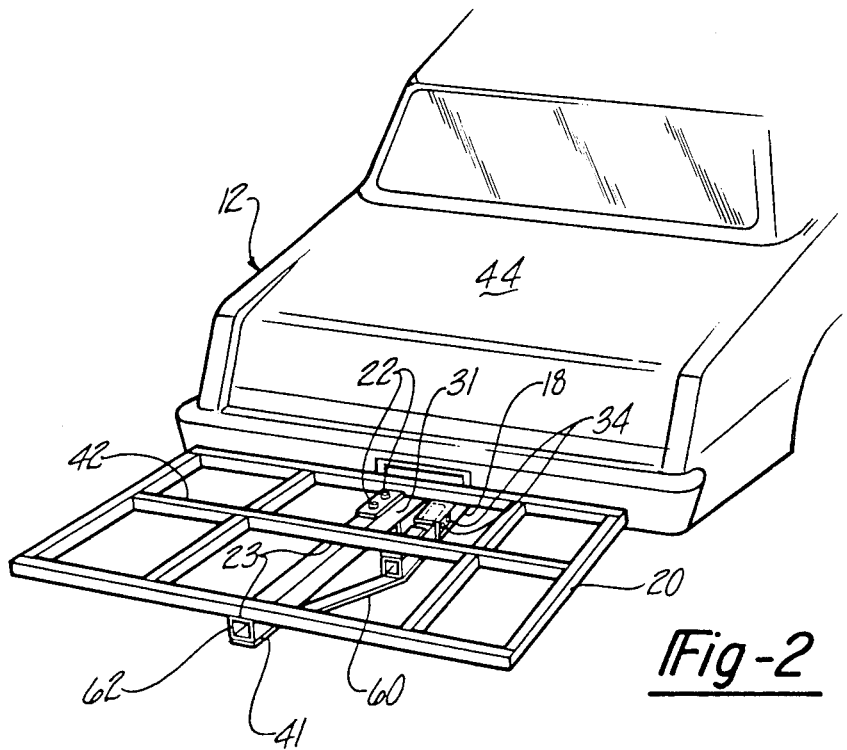
FIG. 2 is a perspective view of the preferred embodiment of the present invention.

With reference now to FIGS. 1 and 2, the cargo carrier 10 according to the present invention is thereshown detachably engaged with a vehicle 12. The vehicle 12 includes a trailer hitch 14, preferably a standard two inch square tube hitch. This standard hitch is conventionally adapted for the vertical insertion of a removable ball therein; however, this ball is preferably not present during use of the present invention. The trailer hitch 14 includes a tongue 16 having a longitudinally extending tongue portion 18. The tongue portion 18 is preferably of somewhat uniform cross section throughout its length.

The carrier 10 according to the present invention first comprises a cargo carrying platform 20. The platform 20 is approximately one and one-half inches thick, and approximately three and one-half feet wide by two and one-half feet long. It is preferably substantially horizontal and somewhat coplanar with the tongue portion 18. The platform 20 is preferably of an open bar construction, so as to provide substantial support for the cargo carried thereon, yet provide ample space for the passage of means (such as one or more straps 46) therethrough or therearound for attaching cargo to the platform.

The cargo carrier 10 of the present invention also comprises a means 24 for the detachable engagement of the carrier 10 with the tongue portion 18. The engagement means 24 is attached to the platform 20 at or near a platform end 26, the platform end 26 being the end proximal to the vehicle 12 and the trailer hitch 14. Preferably, engagement means 24 is attached to the platform 20 by one or more welds 23 and/or other fastening means (not shown) such as a plurality of bolts.

The engagement means 24 first comprises a trailer hitch engaging portion 28. The engaging portion 28 is preferably of a tubular construction, having a cross section of somewhat uniform shape throughout its length. Preferably also, the engaging portion 28 has a square cross section whose exterior dimensions are slightly smaller than the interior dimensions of the tongue portion 18.

The engagement means 24 also comprises a bar extending along the bottom of the platform beneath the longitudinal axis thereof. The platform 20 is attached to the bar 31 by welds 23. Although the bar 31 can be directly attached to the engaging portion 28, for example, by bolting, preferably an offset member 30 is disposed between the engaging portion 28 and the bar 31. The vertical distance that the offset member 30 displaces the platform 20 relative to the tongue portion 18 is small, as compared to the vertical distance between the tongue portion 18 and the continuation of the slip stream from the aerodynamic surfaces of the vehicle (measured at the end of the vehicle body), so that the platform 20 and any cargo carried thereon do not interfere substantially with the pattern of aerodynamic flow around the body and thereby increase the wind resistance of the vehicle. The offset member 30 is attached to the bar 31 by a pair of bolts 22, and welded to the engaging portion 28 by a weld 33.

Preferably, a support rod 60 is provided to give additional support for heavy loads and to reduce shock upon the carrier 10 from uneven roads and the like. The support rod 60 is attached to the underside of the hitch engaging portion 28, by means such as a weld 41 or bolts (not shown). The support rod 60 extends to a rearward end 62 of the bar 31 and is similarly attached thereto.

The tongue portion 18 is provided with one or more holes 32 which are adapted for registration with one or more holes provided in the engagement means 24, preferably in the engaging portion 28. Preferably, each of the tongue portion 18 and the engaging portion 28 have at least one pair of holes 32 and 34 disposed therein, respectively, one each of said holes disposed on either side of the tongue portion 18 and the engaging portion 28. The holes are dimensioned so as to permit the passage of a clevis pin 36 therethrough when the holes are in registration or alignment with one another. A lock 38 is preferably provided so as to prevent the inadvertent or unwanted removal of the clevis pin 36 from the holes 32 and 34. The holes 32 and 34, the clevis pin 36 and the lock 38 thereby comprise a means 39 for retaining the engagement portion 28 and the tongue portion 18 in engagement with one another, and thus the carrier 10 and the vehicle 12 in engagement with one another. Alternatively, the clevis pin 36 can be secured by a hitch pin clip (not shown).

The cargo carrier 10 also preferably comprises a cargo enclosure 40 attached to an upper surface 42 of the platform 20. The cargo enclosure 40 is preferably dimensioned so as to extend across substantially all of the platform 20. The cargo enclosure 40 can be of any desired height, but for efficient operation of the vehicle 12 it is preferred that the upper surface 43 of the cargo enclosure 40 be positioned and be of such a height so as to approximate a continuation of the aerodynamic surface 44 of the vehicle 12. Of course, it is preferable and convenient to make the cargo enclosure of two pieces, the pieces being engageable in a weatherproof fashion with one another. Also preferably, the cargo enclosure 40 is attached to the upper surface of the platform 20 by a means such as a set of straps 46 passing through or around the platform 20 and the cargo enclosure 40. Other attaching means, such as bolts or the like, can be employed as well. In a particularly preferred embodiment, a bottom 47 of the enclosure 40 is affixed to the platform 20 by means (not shown) such as a plurality of bolts, and the straps 46 omitted.

It should be evident from the preceding disclosure that, in order for the upper surface of the platform 42 to be near or within the slipstream of the aerodynamic surface 44 of the vehicle 12, the upper surface 42 of the platform 20 should be disposed between a tangential extension 48 of the aerodynamic surface 44 and a longitudinal axis 50 of the tongue portion 18. Such positioning results in a relatively low aerodynamic resistance, and thus in an increase in the fuel efficiency of the vehicle 12. Conventionally, the surface 44 and the axis 50 will be somewhat adjacent at the rear of the vehicle 12 and somewhat parallel to each other.

Although the upper surface of the platform 42 may be disposed beneath the longitudinal axis 50 of the tongue portion 18, and still be within the scope of the present invention, as a practical matter such a disposition is probably not preferred. The end of the carrier 10 distal to the vehicle 12 might touch the ground if the upper surface 42 of the platform 20 was so disposed, depending upon the weight of the cargo load, the flexibility of the carrier 10, and the road conditions upon which the vehicle 12 was driven.

Use of the cargo carrier 10 according to the present invention is straightforward. Starting from an engaged position, as shown in FIG. 1, the straps 46 are released and the cargo enclosure 40 is removed from the platform 20. The lock 38 is then unlocked, and the clevis pin 36 removed from the holes 32 and 34. The carrier 10 may then be easily slid from the tongue portion 18, because of the corresponding but slightly smaller cross section of the engaging portion 28. The entire disengagement process of the carrier 10 from the vehicle 12 can be performed in approximately one minute or less.

Attachment of the disengaged carrier 10 to the vehicle 12 is similarly straightforward. The engaging portion 28 is disposed parallel to and inserted into the tongue portion 18, the upper surface 42 of the platform 20 facing upwards. The carrier 10 is slid along the tongue portion 18 until the holes 32 in the tongue portion 18 are in registration with the holes 34 in the engagement portion 28. The clevis pin 36 is inserted into the holes 32 and 34, and locked therein by the lock 38. The cargo enclosure 40 is then attached to the platform 20 by use of the straps 46 and/or bolts (not shown). Of course, for convenience, it may be easier to first dispose the empty cargo enclosure 40 on the platform, then load the enclosure, and subsequently attach it to the platform 20 by the straps 46. Again, installation of the carrier 10 on the vehicle 12 generally takes approximately one minute or less.

Significant advantages arise from the cargo carrier construction according to the present invention. The cargo carrier 10 is substantially of one piece construction. It is connected solely to the tongue of a standard trailer hitch, and the engaging means serves as the sole means for transferring the weight of the carrier and its associated cargo to the vehicle. No support members or nuts or bolts are required to attach the carrier to the vehicle, other than the clevis pin previously described. Of course, other retaining means 39 can be provided, with the resulting carrier still remaining within the scope of the present invention.

Of course, the carrier 10 of the present invention can be made of larger or smaller dimensions than those previously described. Both the shape and size of the cargo carrying platform 20 and the cargo enclosure 40 can be varied according to the make or model of vehicle on which the carrier is to be employed, as well as according to the type of cargo (firewood, lumber, tools, merchandise, or the like) which will be carried.

Other advantages are evident as well. Use of the clevis pin 36 means that no tools are required for attaching the carrier to the vehicle. The carrier 10 does not need to connect to either the vehicle body or the vehicle bumper. It is employable with a standard trailer hitch or equalizer hitch. The cargo enclosure is preferably both weatherproof and lockable, so as to protect luggage, cargo and/or valuables. The lock 38 provides additional security to hinder the surreptitious removal of cargo from the carrier 10. Finally, the platform 20 and cargo enclosure 40 are preferably dimensioned large enough to carry packages, suitcases or merchandise of substantial size.

Figure 3:
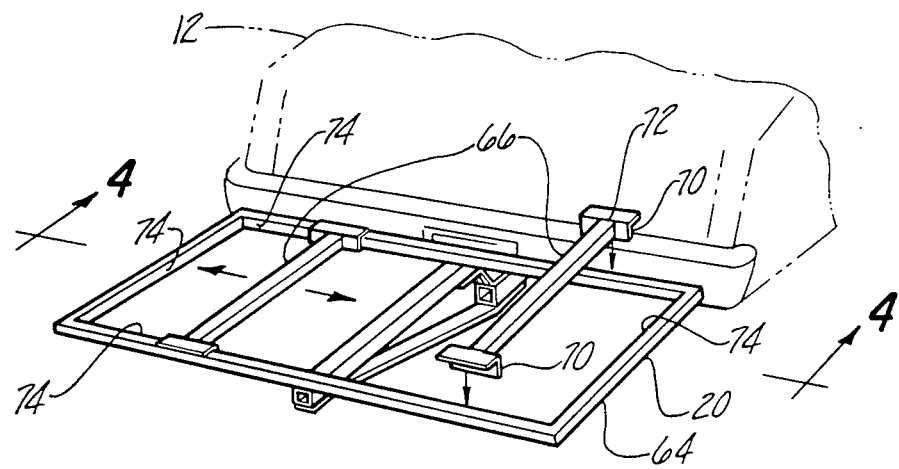
FIG. 3 is a perspective view of another preferred embodiment of the present invention.
Figure 4:
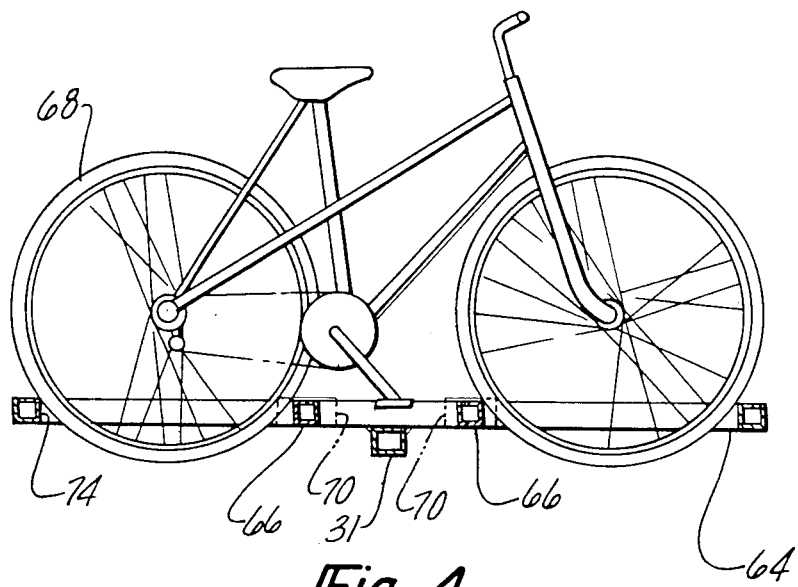
FIG. 4 is a cross-sectional view taken along line 4—4 of FIG. 3, with parts removed for clarity.

With particular reference now to FIGS. 3 and 4, another preferred embodiment for the present invention is thereshown, wherein the platform 20 comprises a rectangular frame 64, instead of the open construction described earlier. A plurality of selectively movable cargo supports 66 are insertably disposed between the sides of the frame 64. Cargo, such as a bicycle 68, rests thereon.

Preferably, the four sides of the frame 64 each comprise a 1½ inch square tube, as do the supports 66. An angled plate 70 having an L-shaped cross section is affixed to each end 72 of each of the supports 66. The length of the supports 66 is selected so that the plates 70 slidably engage the interior walls 74 of the frame 64, when inserted therebetween. It is preferred that this engagement is frictionally strong enough so that the supports 66 will not bounce upwards from road shocks or slide transversely due to the weight of the cargo, yet be frictionally weak enough to permit the supports 66 to be manually shifted when desired. Except for these changes, this embodiment is similar to that described earlier, and is attached to the vehicle in the same way.

Having described my invention, however, many modifications thereto will become apparent to one skilled in the art to which it pertains without deviation from the spirit of the invention as defined by the scope of the appended claims.

I claim:

1. A carrier engageable with the trailer hitch tongue of a vehicle, said tongue having a longitudinally extending tongue portion of substantially uniform cross section, comprising:

a rectangular frame comprising two pairs of opposing side members;

means affixed to said frame for insertably engaging said tongue portion;

said engaging means being the sole means for connecting said carrier to said vehicle and for transferring the weight of said carrier to said vehicle;

at least one movable cargo support member disposed between one of said pairs of side members, said support member comprising a pair of ends one each adjacent to one side member of said one pair; and means on said ends of said support member for attaching said support member to said one pair of side members so that said ends of said support member are movable along said one pair of side members;

wherein said support member is slidable along said one pair of side members, wherein each opposing side member comprises an interior wall, wherein said support member is insertable between said interior walls, and wherein said attachment means comprises an L-shaped plate abutting said interior wall and the top of said side member.

2. The invention according to claim 1, wherein said carrier is metal.

3. The invention according to claim 1, wherein said frame and said support member are tubular and are square in cross section.

4. The invention according to claim 1, wherein one of said pairs of side members comprises one side member proximal to said engaging means and another side member distal to said engaging means, and wherein said combination further comprises a frame support bar extending beneath a longitudinal axis of said frame from said engaging means to said distal side member.

* * * * *